UNITED STATES PATENT OFFICE.

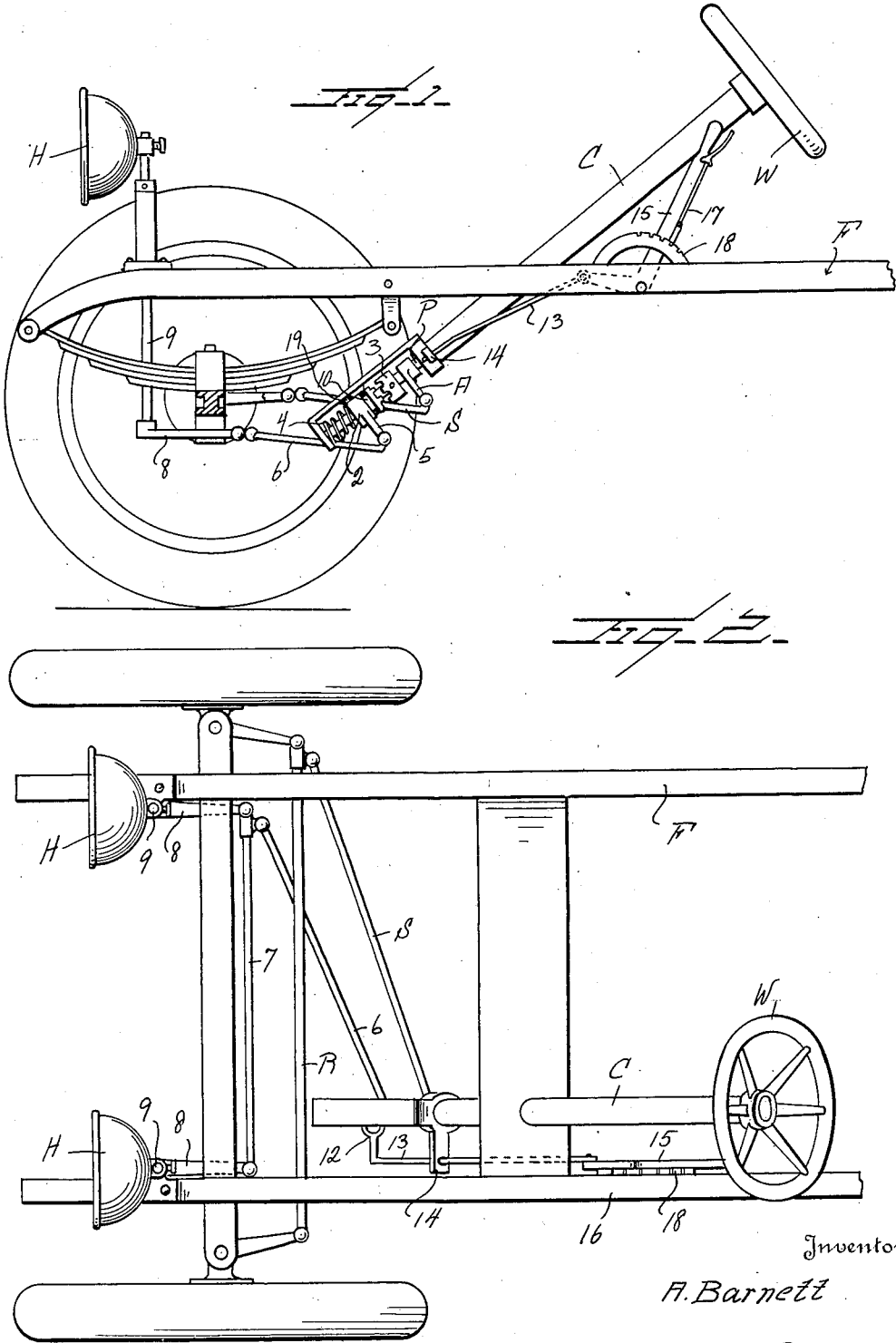

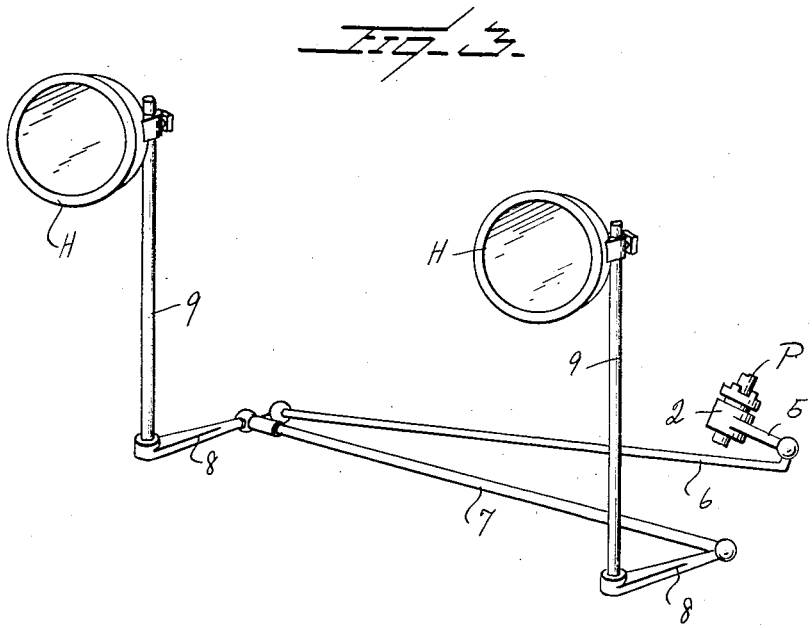
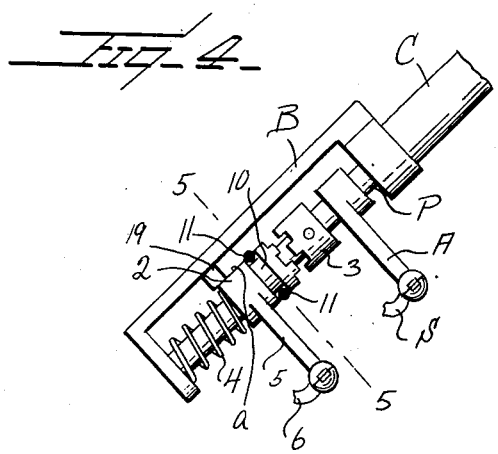
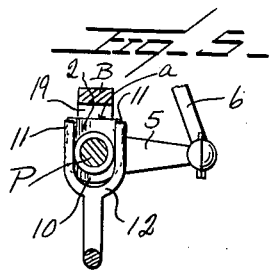

ANTHONY BARNETT, OF STONY BOTTOM, WEST VIRGINIA.

DIRIGIBLE HEADLIGHT.

1,359,313. Specification of Letters Patent. Patented Nov. 16, 1920.

Application filed January 26, 1920. Serial No. 354,128.

*To all whom it may concern:*

Be it known that I, ANTHONY BARNETT, a citizen of the United States, residing at Stony Bottom, in the county of Pocahontas and State of West Virginia, have invented certain new and useful Improvements in Dirigible Headlights, of which the following is a specification, reference being had to the accompanying drawings.

This invention relates to certain improvements in dirigible headlights, and it is an object of the invention to provide a novel and improved mechanism operated from the steering post or kindred member to cause the headlight to turn in unison with and in the same general direction as the steering wheels when the direction of travel of the vehicle is changed.

Another object of the invention is to provide a novel and improved mechanism for operating a dirigible headlight including means whereby said mechanism may be rendered operative or inoperative at will.

An additional object of the invention is to provide a novel and improved mechanism for a dirigible headlight wherein two relatively movable clutch members are carried by a steering post and normally in working relation, and wherein one of said clutch members is operatively engaged with the headlight, together with means for moving one of said clutch members with respect to the other to disengage the same.

The invention consists in the details of construction and in the combination and arrangement of the several parts of my improved dirigible headlight whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation illustrating a dirigible headlight mechanism constructed in accordance with an embodiment of my invention.

Fig. 2 is a view in top plan of the structure illustrated in Fig. 1.

Fig. 3 is a fragmentary view in perspective illustrating the connection between the lamp posts and the operative connection with one of the clutch members.

Fig. 4 is a fragmentary view in elevation of the clutch members carried by the post; and Fig. 5 is a sectional view taken substantially on the line 5—5 of Fig. 1.

As disclosed in the accompanying drawings, F denotes the frame or chassis of a vehicle, preferably an automobile, and C denotes a steering gear column or tubing supported in a conventional manner. Disposed through the column or tubing C is a steering post P adapted to be rocked or rotated, as is well known, through the medium of the steering wheel W or its equivalent. The post P below the column or gearing C is operatively engaged in a conventional manner with the steering rod R comprised in the steering mechanism for the vehicle through the medium of the steering gear connecting rod S and the steering gear ball arm A. The post P extends downwardly beyond the arm A and the lower or free end portion of said post P is rotatably supported in an end portion of a bracket or frame B suitably anchored, as at 1, to the lower portion of the column or gear tubing C.

Loosely mounted on the lower portion of the post P and capable of sliding movement longitudinally of the post P, is a clutch member 2 which is adapted to have working engagement with a clutch member 3 keyed to the post P. The clutch member 2 is constantly urged into working engagement with the clutch member 3 through the instrumentality of an expansible member 4, herein disclosed as a coil spring, encircling the post P and interposed between the clutch member 3 and the lower end portion of the post P or more particularly the portion of the bracket or frame B with which the post P coacts.

The clutch member 2 is provided with a rock arm 5, operatively engaged by the connecting rod 6 with a rod 7. The rod 7 is operatively engaged with and connects the free end portion of the arms 8 carried by and substantially perpendicularly related to the vertically disposed lamp posts 9.

The lamp posts 9 are rotatably supported in a conventional manner by the frame or chassis F and have secured to their upper end portions the headlights or lamps H which may be of any type preferred.

With the clutch members 2 and 3 in working engagement, it will be obvious that upon operating the post P to effect a steering operation of the vehicle, the rod 7 will be caused to move in a direction to impart rocking or turning movement to the lamp post 9 in unison with and in the same general direction as the lateral or steering movement of the front wheels of the vehicle. The periphery of the clutch member 2 is provided with an annular groove 10 substantially concentric to the axis of said member 3 and in which extend the inwardly directed pins or fingers 11, carried by the extremities of the fork 12. The fork 12 straddles the member 3 and is carried by the lower end portion of a rod 13 pivotally supported at a desired point intermediate its ends by an outstanding bracket 14 carried by the frame or bracket B.

Operatively engaged with the upper end portion of the rod 13 is the lower end portion of a lever 15, preferably pivotally supported at a desired point intermediate its ends by a side beam or member 16 of the frame or chassis F. The lever 15 is adapted to extend upwardly within the body of the car and in a position to be readily grasped by the operator so that upon throwing the lever 16 in one direction, the clutch member 2 will be moved in a direction away from or out of working engagement with the clutch member 3. In order to maintain the clutch member 2 in such inoperative position, the lever 15 is provided with a latch mechanism 17 of any ordinary or preferred type and which coacts with the rack 18 herein disclosed as carried by and extending upwardly from the adjacent side member or beam 16 of the frame or chassis F. Upon movement of the lever in an opposite direction, the clutch member 2 is caused to have working engagement with the clutch member 3 so that the requisite turning movement of the headlights or lamps H upon a steering operation will occur.

The upper portion of the clutch member 2 or the peripheral portion thereof opposed to the bracket or frame B is flattened, as at $a$, and is adapted to have contact with the inwardly directed lug 19 carried by the bracket or frame B when said clutch member 2 has been adjusted into an inoperative position or out of working engagement with the clutch member 3. By this means, the clutch member 2 is held against rocking or rotary movement around the post P so that when it is not desired to have the headlights or lamps H automatically turned, said headlights or lamps will be maintained in a straight-ahead position.

From the foregoing description, it is thought to be obvious that a dirigible headlight constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

In combination with a vehicle including a steering mechanism comprising a steering post, a lamp post supported for rocking movement, a clutch member keyed to the steering post for rotation therewith, a second clutch member loosely mounted on the steering post and provided with a rock arm, and operative connection between the rock arm of the clutch member and the lamp post, a column through which the steering post extends, a frame secured to said column and serving as a support for the lower portion of the steering post, an inwardly directed lug carried by the frame and adapted to engage a flattened portion formed on the second clutch member whereby the member is held against rocking movement when separated from the first named clutch member, a compression spring surrounding said post and extending intermediate said frame and the second clutch member whereby the second clutch member is normally forced into engagement with the first clutch member and means for holding said clutch members out of engagement.

In testimony whereof I hereunto affix my signature.

ANTHONY BARNETT.